(12) United States Patent
Parvey

(10) Patent No.: US 9,428,241 B1
(45) Date of Patent: Aug. 30, 2016

(54) MOTORCYCLE HANDLEBAR GRIP ASSEMBLY

(71) Applicant: Kuryakyn Holdings, LLC, Somerset, WI (US)

(72) Inventor: Daniel Parvey, New Richmond, WI (US)

(73) Assignee: KURYAKYN HOLDINGS, LLC, Somerset, WI (US)

( * ) Notice: Subject to any disclaimer, the term of this patent is extended or adjusted under 35 U.S.C. 154(b) by 0 days.

(21) Appl. No.: 14/686,358

(22) Filed: Apr. 14, 2015

(51) Int. Cl.
*B62K 21/26* (2006.01)

(52) U.S. Cl.
CPC .................... *B62K 21/26* (2013.01)

(58) Field of Classification Search
CPC ...... B62K 21/26; B62K 23/02; B62K 23/04; B62H 3/02; A63B 53/14; Y10T 16/466; Y10T 74/20828
See application file for complete search history.

(56) References Cited

U.S. PATENT DOCUMENTS

| | | | | |
|---|---|---|---|---|
| 5,823,069 A * | 10/1998 | Roark | .................... | B62K 21/26 16/DIG. 19 |
| 6,421,879 B1 * | 7/2002 | Gratz | ..................... | B62K 21/26 16/422 |
| 8,365,635 B2 * | 2/2013 | Grimes | .................. | B62K 21/26 74/551.8 |
| 2007/0067960 A1 * | 3/2007 | Lee | ........................ | B25G 1/102 16/421 |

\* cited by examiner

*Primary Examiner* — Adam D Rogers
(74) *Attorney, Agent, or Firm* — Barnes & Thornburg LLP

(57) ABSTRACT

A motorcycle handlebar grip assembly includes an outer grip tube and an inner grip tube. The outer grip tube includes a groove in the inner tube wall surface, which aligns with a groove in an outer tube wall surface of the inner grip tube. A spring loaded retainer clip is positioned within the grooves of the inner and outer grip tubes to secure the inner and outer grip tubes together without the need for an adhesive.

4 Claims, 5 Drawing Sheets

MOTORCYCLE HANDLEBAR GRIP ASSEMBLY

BACKGROUND

Motorcycle handlebars are equipped with grips designed to provide secure and comfortable location for the hands of an operator to steer the motorcycle. There continues to be a need for motorcycle handlebar grip assemblies that are easy to assemble and mount to a motorcycle.

SUMMARY

A motorcycle handlebar grip assembly includes an outer grip tube and an inner grip tube. The outer grip tube comprises a tubular wall having an inner diameter and an outer diameter. An end portion of the tubular wall further comprises a wall groove in the inner diameter. The wall groove has an inner diameter that is larger than the wall inner diameter. The inner grip tube comprises a first tubular wall portion and a second tubular wall portion, the second tubular wall portion having an outer diameter greater than that of the first tubular wall portion. The second tube wall portion has a ramped wall portion and a groove adjacent to the ramped wall portion. The groove of the second tube wall portion defines an inner diameter that is smaller than the outer diameter of the second wall portion. The inner grip tube is positioned within the outer grip tube with the wall groove aligned with the groove of the second tube wall portion. A spring-loaded retainer clip is positioned within the wall groove and the groove of the second tube wall portion.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration exemplary embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments or variations may be utilized and structural or logical changes may be made without departing from the scope of the present invention. The following detailed description, therefore, is not to be taken or construed in a limiting sense, and the scope of the present invention is defined solely by the appended claims. The terms used in the claims are intended to have their plain, ordinary meaning and no disclosure or written description herein shall be construed to specially or uniquely define the claim terms unless it is explicitly stated herein that such term is being given a specific definition.

Figure 1:
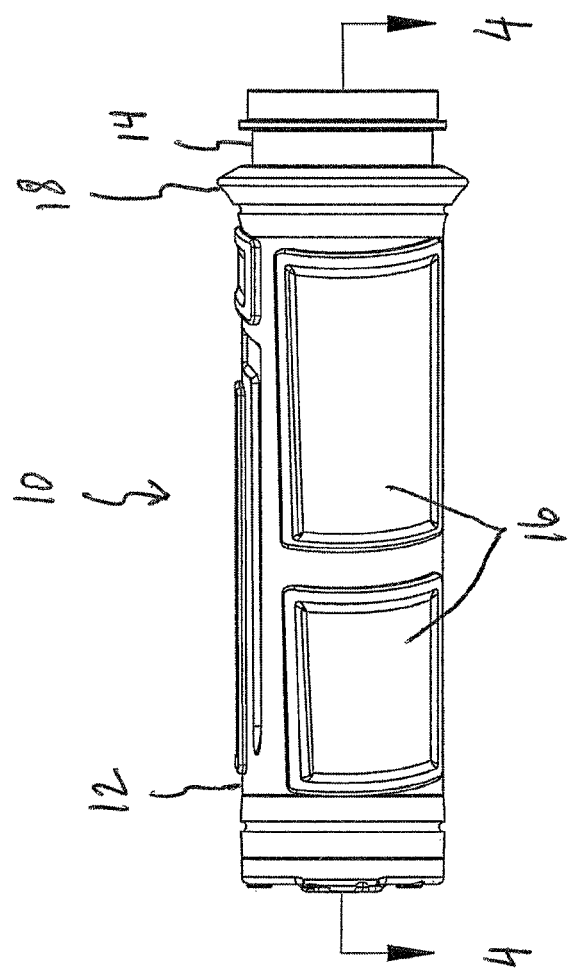
FIG. 1 is a side view of a motorcycle handlebar grip assembly of the present invention.

FIG. 1 is a side view of one embodiment of motorcycle handlebar grip assembly 10 of the present invention. Grip assembly 10 is comprised of an outer grip tube 12, and an inner grip tube 14 which extends within outer grip tube 12. In one embodiment, outer grip tube 12 includes a plurality of rubber grip elements 16 which protrude through openings in tube 12. In one embodiment outer grip tube 12 is formed from a metal material, such as aluminum. The outer grip tube 12 is configured with a radially enlarged end 18, which aids in securing the outer grip tube to the inner grip tube, as will be discussed further. In one embodiment, the inner grip tube 14 is comprised of a plastic material, such as nylon. In one embodiment, the inner grip tube 14 functions as a throttle tube for controlling the throttle of a motorcycle.

Figure 2:
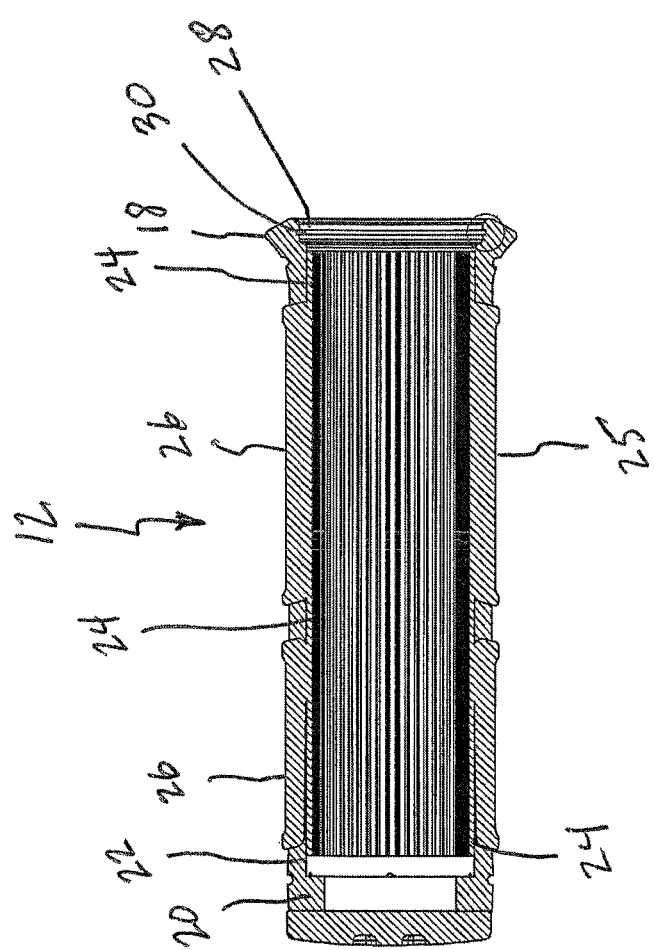
FIG. 2 is a cross-sectional view of the outer grip tube of the motorcycle handlebar grip assembly of FIG. 1.

FIG. 2 is a cross-sectional view of the outer grip tube 12 of the motorcycle handlebar grip assembly 10. As shown in FIG. 2, the outer grip tube 12 includes a cylindrical wall 20 which defines an inner cylindrical surface 22 that extends the length of tube 12. Positioned within tube 12 is a generally cylindrical rubber sleeve 25, which has first portions 24 that engage the inner cylindrical wall 20 of tube 12, and second portions 26 that protrude through openings formed in tube 12 to function as grip elements 16 for a motorcycle operator's hand. As further shown in FIG. 2, the radially enlarged end 18 of the outer grip tube 12 defines a cavity 28 that has an inner diameter that is larger than an inner diameter of wall 20. Cavity 28 includes a groove 30 having a radially increased diameter relative to cavity 28.

Figure 3:
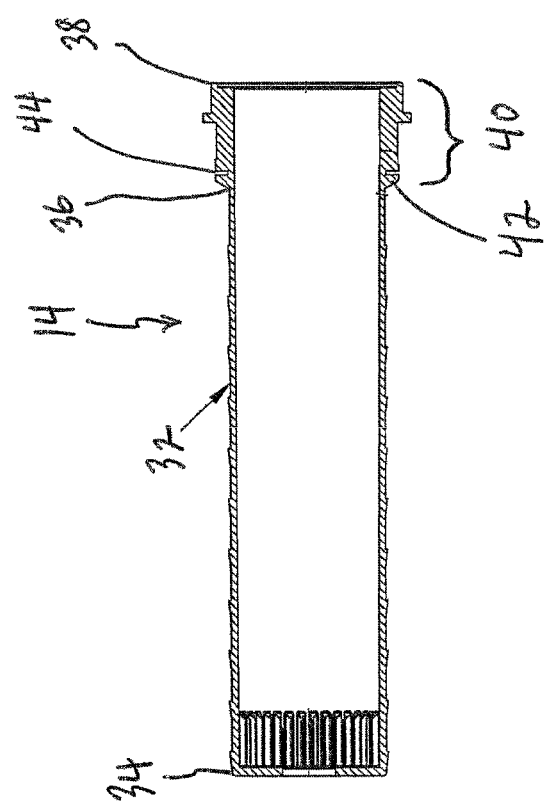
FIG. 3 is a cross-sectional view of the inner grip tube of the motorcycle handlebar grip assembly of FIG. 1.

FIG. 3 a cross-sectional view of the inner grip tube 14 of the motorcycle handlebar grip assembly 10. As shown in FIG. 3, inner grip tube 14 includes a cylindrical wall 32 that extends from a first end 34 to a transition 36 near second end 38. The outer diameter of wall 32 is sized to fit closely within the outer grip tube 12. Between transition 36 and second end 38, wall 32 is radially increased to form an end wall portion 40, while maintaining a constant inner diameter to tube 14. Immediately adjacent transition 36, end wall 40 includes a tapered or ramped portion 42. Adjacent to the ramped portion 42, wall 40 is configured with a radial groove 44. Inner grip tube 14 has a length sufficient to extend within the outer grip tube 12 as is common with throttle tube handlebar grip assemblies.

Figure 4:
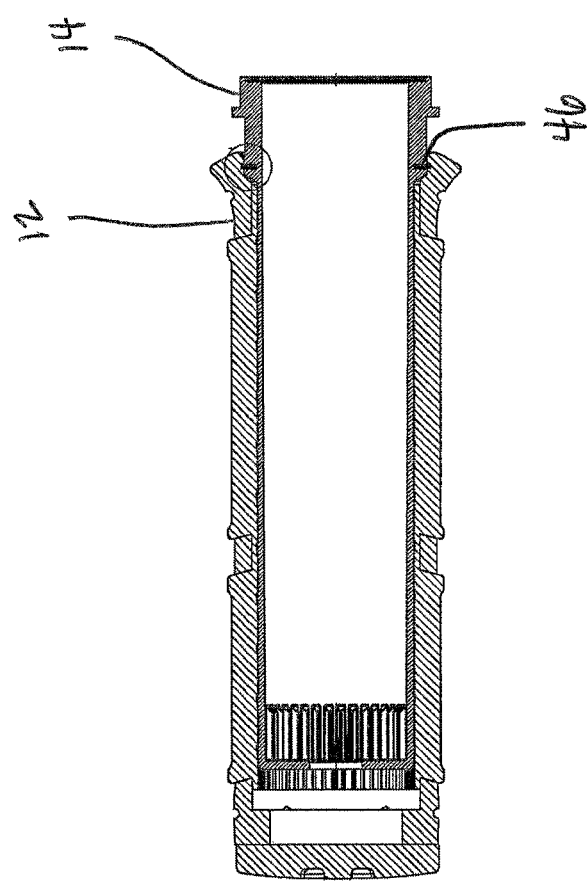
FIG. 4 is a cross-sectional view of the motorcycle handlebar grip assembly of FIG. 1 taken along line 4-4.
Figure 4A:
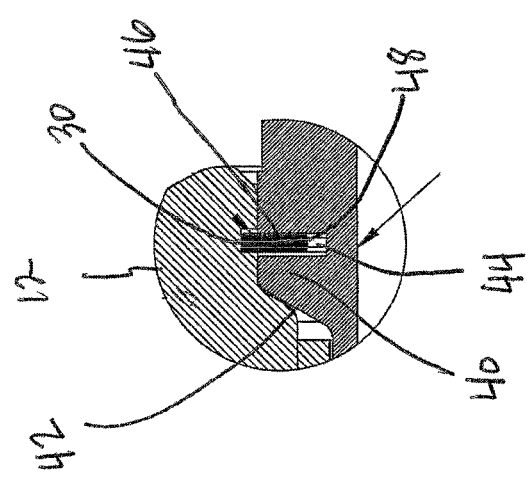
FIG. 4a is an enlarged cross-sectional view of a retainer clip seated in the retainer clip grooves of the inner and outer grip tubes of the motorcycle handlebar grip assembly of the present invention.

As shown in FIGS. 4 and 4a, when the inner grip tube 14 is fully inserted within the outer grip tube 12, groove 30 of the outer grip tube 12 aligns with groove 44 of the inner grip tube 14. When grooves 30 and 44 are so aligned, a spring-loaded retainer clip 46 is positioned within grooves 30 and 44 to secure the inner and outer grip tubes together. As more clearly shown in FIG. 4a, before assembly, retainer clip 46 in the form of a split o-ring, is positioned within groove 30 of the outer grip tube. The inner grip tube 14 is then inserted within the outer grip tube 12 until the ramped portion 42 of the inner grip tube 14 engages the retainer clip 46. As the inner grip tube 14 is urged further within the outer grip tube 12, an inner diameter surface 48 of the retainer clip 46 travels up the ramped portion 42 thereby increasing the inner diameter of clip 46 to the level of the outer diameter of wall 40. When grooves 30 and 44 align, retainer clip 46 expands to its resting diameter within groove 44, thereby securing the outer grip tube 12 to the inner grip tube 14. The handlebar grip assembly of the present invention simplifies construction of a motorcycle handlebar grip, and reduces construction costs, by avoiding the need for the use of adhesives to secure the outer grip to the inner grip tube.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A motorcycle handlebar grip assembly comprising:
   an outer grip tube comprising a tubular wall having a wall inner diameter and an outer diameter, an end portion of the tubular wall further comprising a wall groove, the wall groove having an inner diameter that is larger than the wall inner diameter;
   an inner grip tube comprising a first tubular wall portion and a second tubular wall portion, the second tubular wall portion having an outer diameter greater than that of the first tubular wall portion, the second tubular wall portion having a ramped wall portion and a groove adjacent to the ramped wall portion, the groove defining an inner diameter that is smaller than the outer diameter of the second tubular wall portion, the inner grip tube being positioned within the outer grip tube with the wall groove aligned with the groove of the second tubular wall portion; and
   a spring-loaded retainer clip positioned within the wall groove and the groove of the second tube wall portion.

2. The motorcycle handlebar grip assembly of claim 1 wherein the outer grip tube comprises a tube shell having a length and tube wall, the tube wall configured to define one or more openings, and a rubber insert positioned within the tube shell, a portion of the rubber insert extending through the one or more openings, wherein the inner grip tube secures the rubber insert relative to the tube shell.

3. The motorcycle handlebar grip assembly of claim 2 wherein the inner grip tube is secured to the outer grip tube solely by the retainer clip.

4. A method of assembling a motorcycle handlebar grip assembly having an outer grip tube and an inner grip tube, wherein the outer grip tube comprises a tubular wall having a wall inner diameter and an outer diameter, an end portion of the tubular wall further comprising a wall groove, the wall groove having an inner diameter that is larger than the wall inner diameter, and wherein the inner grip tube comprises a first tubular wall portion and a second tubular wall portion, the second tubular wall portion having an outer diameter greater than that of the first tubular wall portion, the second tubular wall portion having a ramped wall portion and a groove adjacent to the ramped wall portion, the groove defining an inner diameter that is smaller than the outer diameter of the second tubular wall portion, the method comprising:
   inserting a spring loaded retainer clip into the wall groove;
   inserting the inner grip tube within the outer grip tube until the ramped wall portion contacts the spring loaded retainer clip; and
   applying sufficient longitudinal force to the inner grip tube to further move the inner grip tube into the outer grip tube to cause the ramped wall portion to expand the retainer clip and to cause the retainer clip to seat within the groove of the second tubular wall portion.

* * * * *